United States Patent [19]
Colomb

[11] 4,345,276
[45] Aug. 17, 1982

[54] SYSTEM AND METHOD FOR HIGH QUALITY IMAGE REPRODUCTION
[75] Inventor: Denis G. Colomb, Boca Raton, Fla.
[73] Assignee: Sonics Research Corporation, Fort Lauderdale, Fla.
[21] Appl. No.: 182,886
[22] Filed: Aug. 29, 1980
[51] Int. Cl.³ .................... H04N 1/20; G03B 19/00
[52] U.S. Cl. ................................. 358/258; 358/287; 358/903; 358/280; 354/6; 354/7; 364/523
[58] Field of Search ............... 358/258, 284, 287, 903, 358/283, 256, 280; 364/515, 523; 354/5, 6, 7

[56] References Cited
U.S. PATENT DOCUMENTS

| 3,904,816 | 9/1975 | Taudt et al. | 358/280 |
| 3,976,982 | 8/1978 | Eiselen | 364/515 |
| 4,135,212 | 1/1979 | Pugsley et al. | 358/296 |
| 4,196,450 | 4/1980 | Miller et al. | 358/280 |
| 4,214,276 | 7/1980 | Pugsley et al. | 358/256 |

Primary Examiner—John C. Martin
Assistant Examiner—Edward L. Coles
Attorney, Agent, or Firm—John J. Byrne

[57] ABSTRACT

A system and method for reproducing a plurality of images on a printer in printed form in accordance with selectable, variable multiple formats. The method generally comprises the steps of selecting a given one of a plurality of selectable, variable formats, receiving and storing digital data corresponding to each of the plurality of images except for one of the plurality of images, multiplexing the digital data corresponding to each of the plurality of images except for one with the digital data corresponding to that one of the plurality of images, and providing the multiplexed digital data to a gray line printer so as to reproduce the plurality of images in printed form in accordance with the selected format. The system includes a data input multiplexer for multiplexing digital data received in real time with digital data previously received and stored in the picture memory of the system, the multiplexed output being provided, via a high speed line memory, to a gray scale printer for reproduction of the plurality of images in the selected format. In one embodiment, a TV camera is utilized to scan the images to be reproduced, and the system includes an analog-to-digital converter for converting the video signal to digital form, and synchronization circuitry for synchronizing the receiving, storage, output and multiplexing of the digital data corresponding to each of the plurality of images to be reproduced.

13 Claims, 11 Drawing Figures

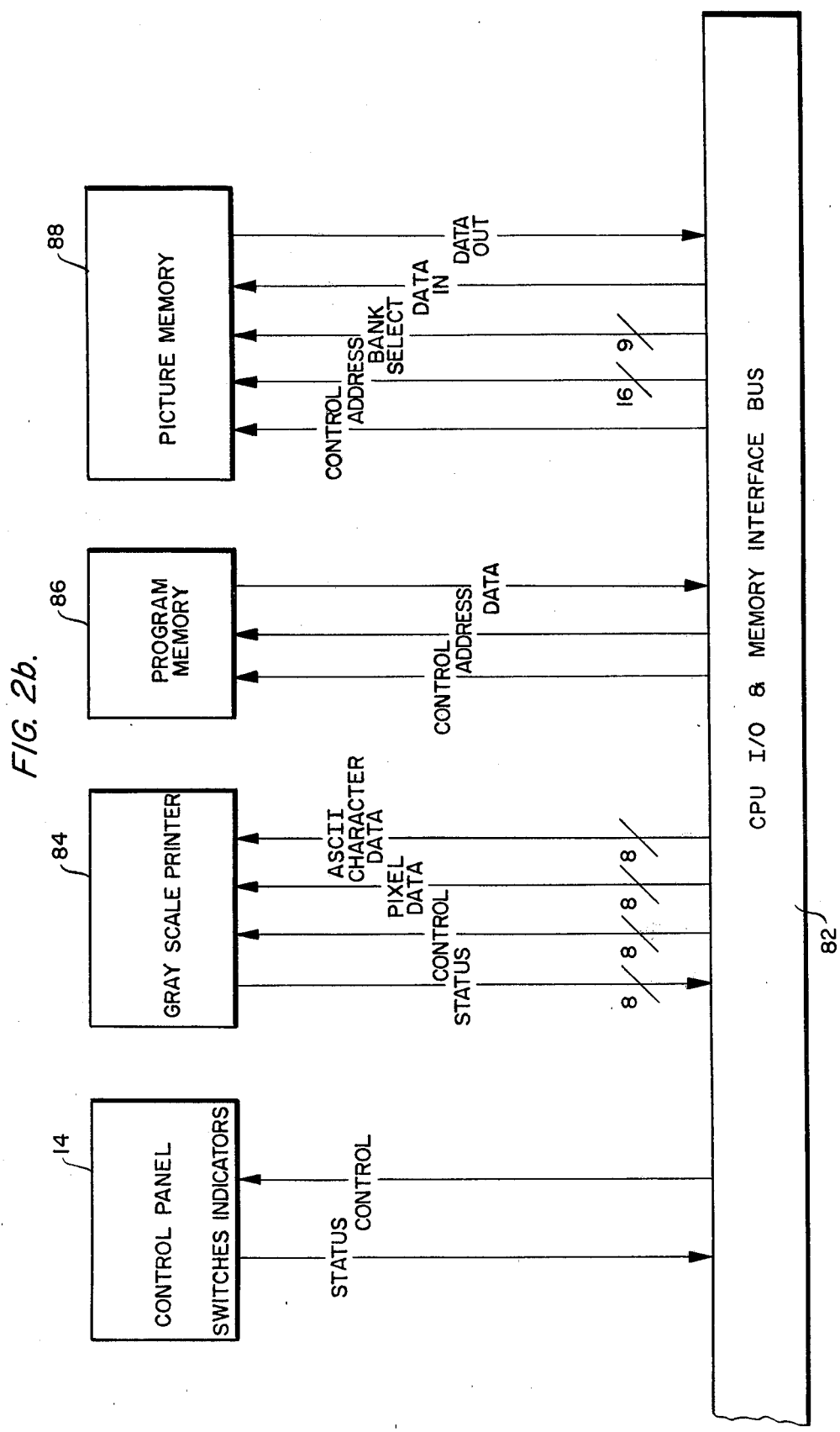

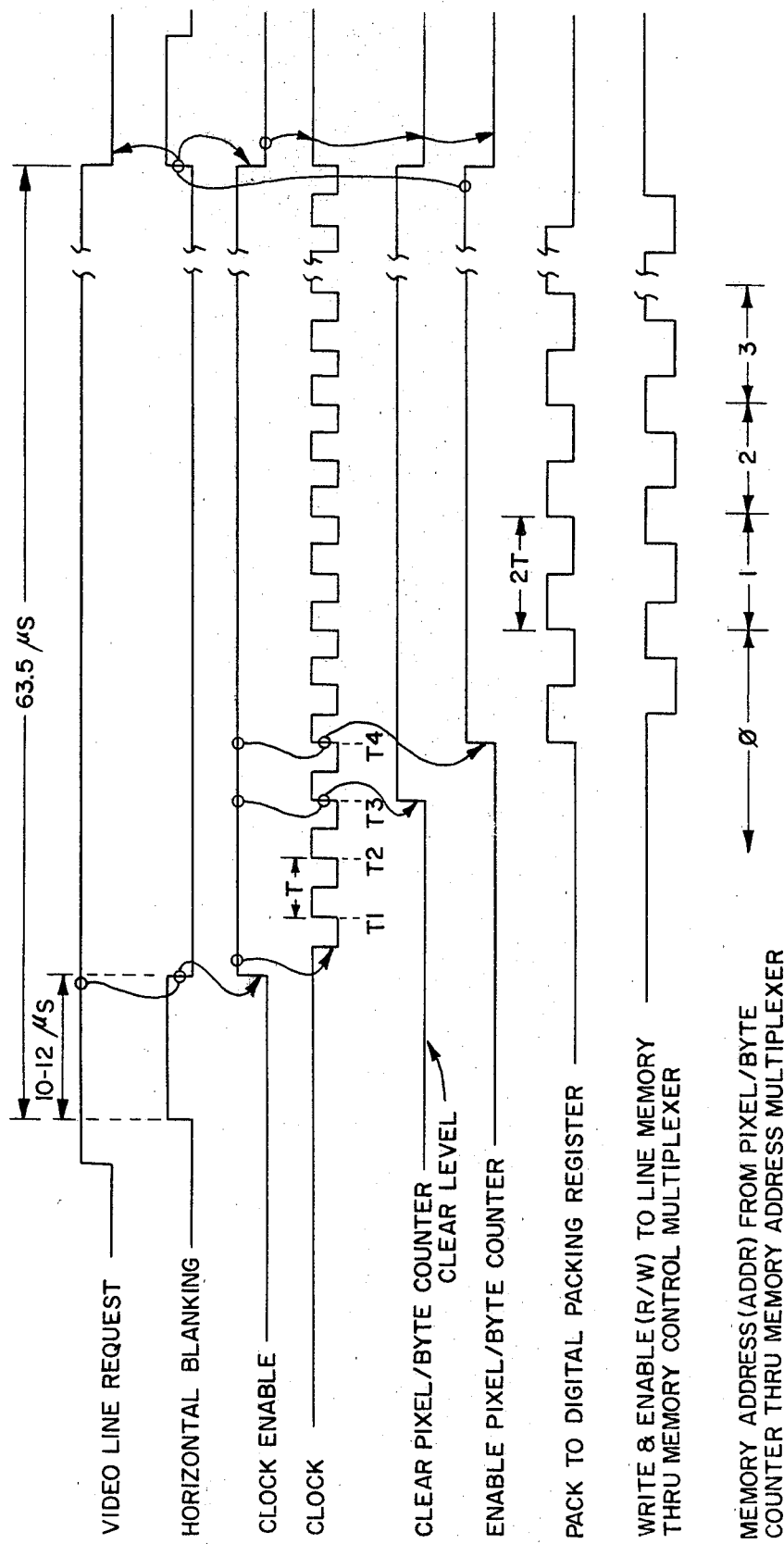

SYSTEM AND METHOD FOR HIGH QUALITY IMAGE REPRODUCTION

BACKGROUND OF THE INVENTION

1. Field of the Invention

The present invention relates to a system and method for high quality image reproduction. In particular, the invention relates to a system and method wherein received image-representing signals are processed to obtain resulting processed data, the resulting processed data is stored, the data thus stored is selectively read out in accordance with operator controlled inputs, and the data thus read out is utilized, in accordance with a gray line printing technique, to produce a high quality reproduction of the original image.

2. Description of the Prior Art

There has been an increasing need, in recent years, within various medical, scientific and technical disciplines, for a technique and system for high quality image reproduction. Until now, the need for such an imaging technique has been satisfied by systems and methods which are slow, often inaccurate, costly and inefficient, and which produce image reproductions of less than adequate quality. Such systems of the prior art have also been limited insofar as capabilities are concerned and lacking in flexibility.

In one such system of the prior art, image reproduction has been accomplished through the use of negative type film (such as silver-based negative type film). The film is loaded into a cassette (typically, an 8×10 cassette), and the cassette is then loaded into an imaging device. Within the imaging device, a TV monitor is positioned at a specific focal distance from the plane of the film, with an objective lens being positioned in the space therebetween, this intervening space also constituting an ether. The TV monitor is connected to a conventional TV camera, the latter scanning the image or object to be reproduced.

Once the contrast, brightness, the F stop of the lens and the exposure time are adjusted, the picture is transmitted through the ether to the film plane where excitation of the silver molecules on the film takes place, and the resultant latent image is recorded permanently within the molecular substructure of the film. The film is then, after a routine exposure procedure, removed from the imager (whether physically by the operator or mechanically by a machine), and is taken to a developing station, where it is subjected to typical photographic developing techniques. Such typical photographic developing techniques may be automated (as is typically the case in photographic processing laboratories), but in any event the film is developed, fixed, stopped, dried and delivered to the technician in finished form. The latter process requires a rather long time period (anywhere from three minutes to five minutes, depending upon the particular film processing/developing technique utilized), and also requires a great deal of heat, electrical energy and chemical supplies to process the film, as well as a good deal of manual activity by the operator.

In such a technique of the prior art, the silver base of the film is often recaptured (by some chemical means), and can be resold. Although this recapturing of the silver base does supply the user with some small offset in the cost of the overall system, the recapturing process is itself very inefficient and costly, as is the operation and maintenance of the overall system.

In such a system of the prior art, the processed film must then be viewed by a light transmission technique; for example, the film is hung on an equal density view box and light is passed therethrough, so that interpretations can be made by appropriate personnel (doctors, scientists, or the like) by viewing the light patterns resulting from the transmission of light through the film.

Another significant disadvantage of such a system relates to the high price of film, the cost of which is ever increasing. In fact, at present, the cost of film is such as to render a large scale operation prohibitive. Consequently, users of such systems are tending to utilize such systems to a lesser degree. This is especially disadvantageous in the area of medical imaging, wherein very harmful and undesirable results (in terms of improper diagnosis and increased liability of medical personnel) can be experienced as a result of failure to produce an adequate number of medical images.

Another typical imaging system of the prior art involves a combination of simple optical and complex positioning mechanisms. The theory of operation is similar to that previously described, and is quite simple. A picture is presented on a picture tube CRT (or TV monitor) of contrast and brightness suited to the operator's taste. Light energy is then passed through an objective lens to a flat plane film surface. Typically, the lens has an adjustable focal length and a standard iris F stop device which can be used to limit the amount of light transmitted to the film plane. Such a lens can be so characterized as to decrease the functional error normally experienced due to CRT curvature and other inadequacies in the CRT monitor and the film plane space.

The type of system thus described is a single-format device, that is, a device capable of producing a single image on a single piece of film. To render this particular format as cost effective as possible, manufacturers have developed a Cartesian coordinate system through which the lens travels and stops in particular quadrant spaces.

Other systems have been developed in order to provide a multi-image capability, that is, to facilitate the positioning of plural images on a single piece of film. Techniques to accomplish this have included a rather complex (and costly) mechanical transport system which moves the images through the Cartesian plane, this being accomplished by a simple X-Y positioning network that will move the lens, and therefore move the image on the film. It should be noted that, in such an arrangement, there exists a percentage of error introduced because of lens curvature in relation to film plane space.

In order to maintain a constant aspect ratio for the image, prior art practitioners have developed special arrangements (including electrical circuitry) which will increase or decrease the picture size on the CRT face, thus maintaining the aspect ratio throughout the film plane space as it relates to the pictures taken. For example, the image on the CRT may be a full screen image in single-image format. If the operator then chooses to switch to a multi-image format (for example, six images on one film), the image on the CRT obviously must decrease, thus becoming smaller. Thus, it is necessary to provide means for automatically driving the lens systems away from the CRT face so that the focal distance and the focal point may be maintained as they relate to the film plane space. This involves further expense in the development of such analog systems (the term "analog systems" being utilized to define systems involving such analog-type electronic equipment as TV cameras and CRT's, as well as the various typical techniques described above).

Prior art practitioners have also developed techniques for displaying a calibration pattern between "picture times," the purpose of the calibration pattern being to establish a zero reference point that would be considered white as it relates to the incoming video signal. This establishes an absolute white level in an effort to achieve better reproduction from picture to picture. However, such a technique constitutes an effort to employ state-of-the-art electronics technology to compensate for the inadequacies of or disadvantages produced by mechanical technology, the overall result being increased cost in development and production of the systems in question.

Another prior art practitioner utilizes a system somewhat similar to the above, but less complex in nature (for example, microprocessors are not at all employed). Thus, such a prior art system does not provide the capability of automatic electrical adjustment of various optical parameters, offering instead a uniform contrast and brightness control for both positive and negative images. In addition, the system does not offer an F stop adjustment, and the only exposure control offered is in the realm of brightness. The system employs an X-Y servo-position system which is reasonably accurate, but offers a great deal of optical abrasion at the film plane space.

A further prior art system employs a mechanical drive mechanism, whereby the operator physically moves the film position in a predetermined pattern, which then allows the multi-formatting to be accomplished in accordance with the manual operation. Of course, the disadvantages of such a manual system are quite clear.

To summarize the above discussion of the prior art, it should be noted that such systems of the prior art all display pictures in the analog realm, that is to say, images are displayed on a CRT picture tube, and a lens system is employed to correct, focus and position the image on a film plane space. All such systems utilize a light transmission method of viewing, since such systems employ silver-based negative-type film. Such systems are, accordingly, characterized by several substantial drawbacks: (1) such systems are quite slow, since various different processes (both automatic and manual) must be interfaced; (2) such systems are inaccurate, this being the result of such factors as optical distortion, and lack of accurate and automatic control of brightness, exposure, focus, etc.; (3) such systems produce reproductions of limited quality, the quality of reproduction being limited by the type of film employed, as well as the overall characteristics of the system; (4) such systems employ (as is evident from the above) analog positioning systems which introduce error, involve interface of electrical, mechanical and manual operations, and are quite often very crude in their operation; and (5) finally, such systems are costly due to size and complexity, as well as maintenance and over-head associated with operation of the system, especially when the system is operated on a large scale. With respect to lack of quality and accuracy in such prior art systems, if such prior systems were employed in the multi-formatting mode of operation to take a series of six pictures, all pictures being taken from the same original image, and if a densitometer were employed to measure the actual light transmission through the film, a five to seven percent variation in reading would be noted between the various pictures. In certain applications, especially those pertaining to the medical usage of such a system, such a variation in error is intolerable.

SUMMARY OF THE INVENTION

The present invention relates to a system and method for high quality image reproduction. More specifically, the invention relates to a system and method, wherein image-representing signals are received and processed in order to obtain resulting processed data, the resulting processed data is stored and then selectively read out in accordance with operator controlled inputs, and the selectively read out data is utilized, in accordance with a gray line printing technique, to produce a high quality reproduction of the original image.

As will be seen in the detailed description below, the system and method of the present invention eliminate, to a very great extent, the analog processing, mechanical and optical operations which characterize systems of the prior art, and which cause such systems of the prior art to be hampered by disadvantages in the form of lack of speed, accuracy, quality and economy in system development and operation. More specifically, the system of the present invention takes advantage of sophisticated digital processing technology, and implements such technology so as to develop an integrated, self-contained system for high quality image reproduction. The result is a system which is not only automated but flexible. For example, users of the system are able to introduce several different images (in the form of image-representing signals) into the system, and then to reproduce those images in any given order or arrangement on a single printed sheet. As a further example, a user of the present system can introduce a single image into the system, and can then easily obtain any number of direct duplicates arranged in any desired array on a printed sheet. Thus, the system and method of the present invention are sufficiently flexible to accommodate various modes of image reproduction, including those involving multi-formatting. By a unique combination of specialized data processing and data storage utilizing a solid-state array, coupled with selective digital data read out with no analog interfaces being involved, the system and method of the present invention are able to provide a true, high quality, analog-type image on paper.

Moreover, as will be seen below, the system and method of the present invention provide a type of multi-formatting which is sufficiently flexible to allow various modes of image reproduction, including automatic image rotation (for example, through 90 degrees) prior to image reproduction. Of course, other modes of image reproduction may be employed to meet special requirements, such as those related to cardiac diagnosis (for example).

Therefore, it is an object of the present invention to provide a system and method for high quality image reproduction.

It is a further object of the present invention to provide a system and method wherein received image-representing signals are processed to obtain resulting processed data, and the resulting processed data is stored in a specially tailored memory structure in accordance with special data storage techniques.

It is a further object of the present invention to provide a system and method for high quality image reproduction wherein pre-stored data is selectively read out in accordance with operator controlled inputs, so as to produce a high quality reproduction of an image corresponding to the pre-stored data, such image being developed in accordance with a gray line printing technique.

It is a further object of the present invention to provide a system and method for high quality image reproduction in accordance with a multi-formatting technique.

It is a further object of the present invention to provide a system and method for high quality image reproduction characterized by flexibility in terms of carrying out image reproduction in accordance with various reproduction modes.

The above and other objects that will hereinafter appear, and the nature of the invention, will be more clearly understood by reference to the following description, the appended claims, and the accompanying drawings.

BRIEF DESCRIPTION OF DRAWINGS

FIG. 1b is a detailed diagram of the control console of the unit of FIG. 1a.

FIGS. 2a and 2b are block diagrams of the system of the present invention.

FIGS. 2c and 2d are a detailed circuit diagram and timing diagram, respectively, relating to the synchronization signal detector of FIG. 2a.

FIG. 2e is a timing diagram relating to the control logic of FIG. 2a.

FIGS. 3a through 3d are flow charts of the operations performed by the micro-processor of FIG. 2a.

DETAILED DESCRIPTION

The present invention will now be described in more detail, with reference to FIGS. 1a and 1b, which depict the unit and control console, respectively, which implement the system for high quality image reproduction.

Figure 1A:
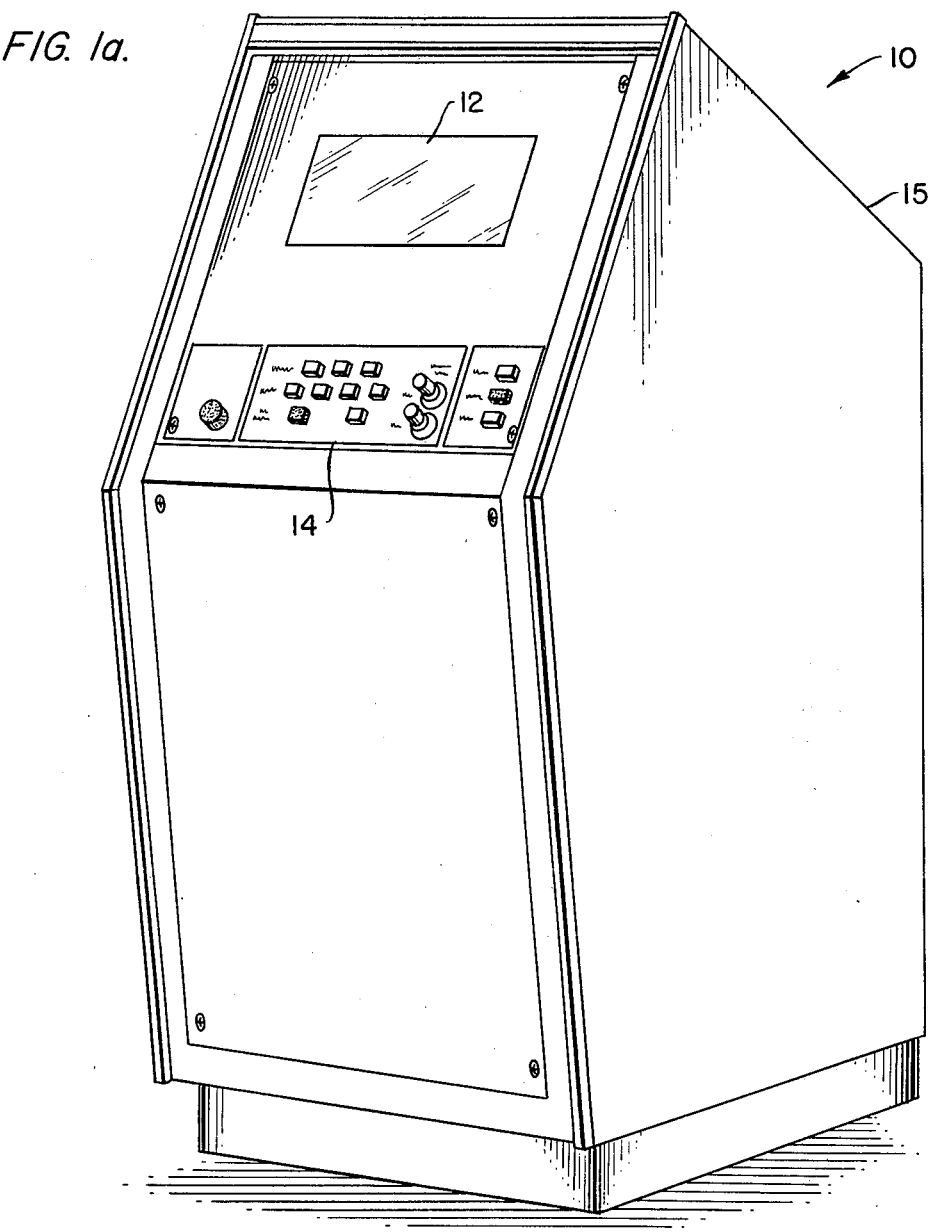
FIG. 1a is the perspective view of an image reproduction unit in accordance with the present invention.

Referring to FIG. 1a, the unit 10 basically comprises a viewing window 12, a control console 14, the latter being arranged within a housing 15, the housing 15 containing the gray line printer (to be discussed in detail below) and associated electronics.

Figure 1B:
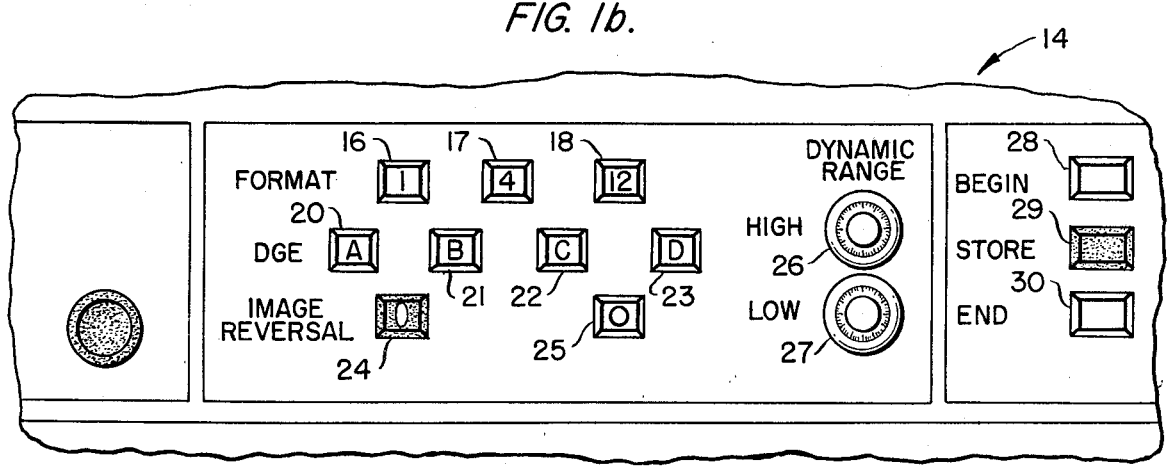

The control console 14 of the unit 10 is shown in more detail in FIG. 1b, and includes format controls 16 through 18, digital gray scale enhancement controls 20 through 23, image reversal controls 24 and 25, dynamic range controls 26 and 27, and operator controls 28 through 30.

Format controls 16 through 18 are employed to provide the operator with a means for selecting various formatting modes. Thus, control 16 is utilized to establish 1× formatting, by means of which a single large format picture is printed during a standard print cycle by the gray line printer. Control 17 provides the operator with the ability to select 4× formatting, by means of which two images may be printed simultaneously. In a preferred embodiment of the invention, the two images printed simultaneously are rotated 90 degrees with respect to the printing page, this rotation being carried out in order to maintain a true aspect ratio. More specifically, the pictures to be printed out in the 4× formatting mode will not physically fit on the standard printing page (for example, 11 inches in width). Therefore, each of the pictures is rotated 90 degrees in order to facilitate printing on a single page without loss of the true aspect ratio.

Control 18 provides the operator with the ability to select 12× formatting, by means of which 12 pictures may be printed on a single sheet of printed paper, with three small size pictures being printed on each of four lines. The pictures printed out in the 12× formatting mode are printed in their normal orientation, that is, without rotation (as was the case in the 4× mode).

The digital gray scale enhancement (DGE) controls 20–23 permit the operator to select the number of shades of gray to be included within the digital gray scale. Thus, by operation of control 20, the operator indicates 16 discrete levels of gray (the maximum number of levels in the system) which are to be included within the digital gray scale. As will be seen in the more detailed discussion below, the 16 levels are quantized by digitization of the video input signal. Thus, actuation of control 20 causes the system, upon analyzing the video input signal, to quantize the video input signal in accordance with 16 discrete levels.

Operation of control 21 permits the operator to select eight shades of gray (as opposed to 16) to be included within the digital gray scale. In the preferred embodiment, this is accomplished by assigning the first two levels of the normal 16-level gray scale to the first level of the 8-level scale selected, with subsequent pairs of levels in the 16-level scale being assigned as a single level in the 8-level scale. Thus, shades 1 and 2 in the A scale (the normal 16-level scale) will be assigned as shade 1 in the B scale, shades 3 and 4 in the A scale will be assigned as shade 2 in the B scale, and so forth, until shades 15 and 16 in the A scale are assigned as shade 8 in the B scale.

Operation of control 22 permits the operator to select a 4-level (C) scale, such that shades 1 through 4 in the A scale will be assigned as the first level in the C scale, shades 5 through 8 in the A scale will be assigned as the second level in the C scale, and so forth.

Finally, actuation of control 23 permits the operator to select a 2-level scale (the D scale), such that the first eight shades in the A scale will be assigned as a first level (corresponding to white), and the last eight shades of the A scale will be assigned as the second level (black) of the D scale.

It is to be noted that, in the normal DGE mode (the A scale of 16 shades), a picture will have a very homogeneous and even blend from black to white. Discrete steps between the various gray shades will not be visible. By switching to the second DGE mode (corresponding to the B scale), the shades of gray will be more absolutely quantized so that exact boundaries may be seen between the levels. Thus, whereas an incoming video signal will be printed in accordance with scale A as an image having a very homogeneous and even blend, when scales B, C or D are chosen, the particular amplitude levels will be absolutely outlined by a border representing a discrete step between one shade of gray and the next. However, it is to be recognized that, in certain applications, choice of the A scale is more appropriate, while in certain other applications, choice of the B, C or D scales is indicated. For example, certain studies relating to the detection of echoes within a liver or a kidney, or certain other studies relating to the detection of bright areas in a nuclear medicine study, the choice of DGE scales B, C or even D can be quite helpful to those interpreting the resulting images. However, it is to be recognized that a principal advantage of the present system and method resides in the fact that such tasks (liver, kidney or nuclear medicine studies) are usually accomplished at present by the use of extremely fast, expensive, time-consuming, large-scale hardware and software systems. In contrast, because the system and method of the present invention involve a very discrete digital machine, these same tasks can be accomplished very quickly and relatively inexpensively, and will result in a picture which is ready for viewing in a short time, thus taking into account "real world" considerations involved in obtaining and interpreting such images.

The image reversal controls 24 and 25 provide the operator with a means of reversing the printing of an image, so as to selectively obtain either positive or negative images. Thus, actuation of one of the controls 24 and 25 results in an image in which the particular background being viewed may be printed white or clear and the image itself may appear as varying tones of gray from white to black. In a reversal of the same image, the background may be dark black and the image may be viewed as a tonal transition from black to white, so that, in one form, the image itself appears to be dark shaded gray, and, in the next form, the picture may seem to be light going from one shade of light to white. Such reversals of the image polarity may be quickly obtained by operator actuation of one of controls 24 and 25. Dynamic range controls 26 and 27 offer the operator the flexibility of adjusting the white and black cutoff point in video separately, so that an operator may lighten or darken the black background, but not affect directly the shape or form, the reference levels of white, etc. In this manner, a white level may be set up and established, and yet a black level may be shifted in and out, darker and lighter, with no direct effect on the white level. The same is true with respect to a fixed black level, with the white being adjustable so that it is lighter or darker (meaning not visible, or with more and more shades of gray appearing as background), without directly affecting the black level.

It is to be noted that, in the latter regard, the system of the present invention presents a significant advance over the prior art systems. Specifically, in picture printing systems of the prior art, any adjustment of a black or a white level directly affects the other adjustment. For example, in standard picture processors using video CRT and film, the knobs or controls are labelled "brightness" and "contrast." Any adjustment of the brightness or the contrast independent of the other will directly affect the other, so that a counter adjustment must be provided.

In contrast, with the improved system and method of the present invention, such provision of a counter adjustment is no longer necessary. In fact, any direct adjustment of a black level affects only the black level and correspondingly, any direct adjustment of the white level affects only the white level.

The final three controls 28 through 30 of the console 14 are considered operator interface buttons, and provide the operator with the means for instructing the system to "begin," "store" and "end." Specifically, control 28 is pressed by the operator in order to begin system operation, with the result that a picture frame counter in the system (to be discussed in more detail below) is reset. It is to be noted that, in a preferred embodiment of the inventive system, the top left hand corner of each picture contains a number, this number being in numerical sequence and having a direct relationship to the number of pictures that have been printed. Even in changing format size, this number is maintained, and the only time the number can be zeroed is upon sequential actuation of control 30 ("end") and control 28 ("begin"). Thus, the function of control 28 is merely to simultaneously reset the frame counter (to be discussed in detail below) to zero.

Control 29 (the "store" control) provides a "real world" interface to the processor of the inventive system, and instructs the processor to make the present picture available in form of a video signal, digitize that signal, and store the resulting digitized picture. In the 4× and 12× modes of operation (involving multi-formatting, as discussed above), the control 29 has two functions. In the 4× mode of operation, pressing control 29 upon occurrence of a first picture frame causes that first frame image to be stored in memory, and pressing control 29 for a second frame causes the second frame to be stored also. Then, the first and second frames are simultaneously printed directly from the memory in which they were stored. As a result, two images are simultaneously printed in parallel. Moreover, pictures 3 and 4 are handled in the same manner, with picture 3 and 4 being stored in memory. Then, pictures 3 and 4 are concurrently recalled from memory, line by line, and printed out in parallel.

In the 12× mode of operation, the first two pictures provided to the system are stored therein and the third picture is then printed in real time. However, at the same time, pictures 1 and 2 are recalled from memory and printed out simultaneously and in parallel with picture 3. A similar procedure takes place with respect to pictures 4, 5 and 6, each of these pictures being printed out in real time and in parallel.

Control 30 (the "end" control) is the means by which the operator instructs the system to terminate the present study. In a preferred embodiment, upon termination of such a study, a test pattern is printed with demographic information available (for example, patient name, bed number, room number, etc.), so that the particular pack of images may be identified as corresponding to a particular patient. The test pattern is provided in order to actually insure quality control of the printing process, and so that there is no question, at a later time as to whether the machine was working at the beginning of the study. This test pattern is generated at the end of each study, and the test pattern is utilized for the following study as well.

Having described the basic functions of the various controls contained in the control console 14 of the unit 10, further description of the functions provided in accordance with the inventive system and method will be covered in more detail below, as this detailed description proceeds.

Figure 2A:
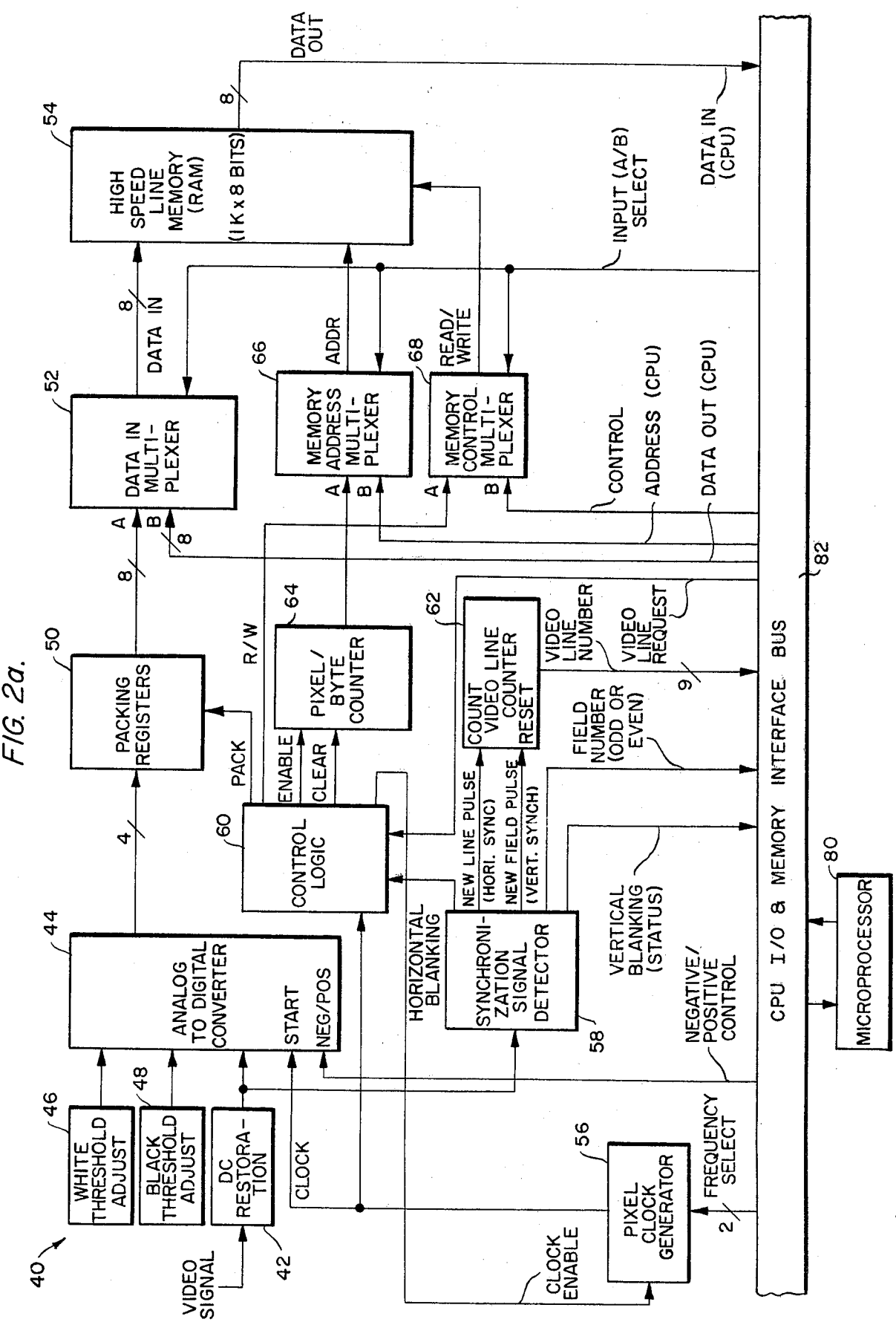

FIGS. 2a and 2b are block diagrams of the overall system of the present invention.

Referring to FIG. 2a, the overall system 40 of the present invention is seen to comprise a DC restoration circuit 42, an analog-to-digital converter (ADC) 44, white and black threshold adjust circuits 46 and 48 (respectively), digital packing registers 50, data in multiplexer 52, a high speed line memory (random access memory or RAM) 54, a pixel clock generator 56, a synchronization signal detector circuit 58, a line store control logic 60, a video line counter 62, a pixel/byte counter 64, a memory address multiplexer 66, a memory control multiplexer 68, and a micro-processor 80. It is to be noted that the micro-processor 80 is connected to the other aforementioned elements by means of a processor, input/output and interface bus 82.

As seen in FIG. 2b, the system of the present invention also includes a system control panel 14 (described above with respect to FIG. 1b), as well as a gray scale printer 84, a program memory 86 and a picture memory 88.

Operation of the system 40 will now be explained in detail with reference to FIGS. 2a and 2b. The RS 170 video signal (provided, for example, from an RS 170 signal generator or from a conventional video camera) is provided to the system 40 by conventional means (for example, a 75 ohm coaxial link). The video signal is provided to a DC restoration circuit 42 which restores the video signal to a base line DC level, that is, establishes a zero base line for the signal. The DC restoration circuit 42 is a conventional restoration circuit which is also provided with an impedance driver (not shown), by means of which the analog video output signal of restoration circuit 42 is sent in two different directions.

The output of the DC restoration circuit 42 is provided (in accordance with the first direction) to ADC 44, which may be implemented by an integrated circuit such as the TDC 1021J chip (manufactured by TRW, Inc.). More specifically, the ADC 44 is a 20 MHz flash analog-to-digital converter which requires no sample-and-hold function and very little buffering. Upon receipt of a "start convert" command, the ADC 44 performs analog-to-digital conversion so as to convert the analog video signal into a four-bit digital output, provided to digital packing registers 50.

More specifically, ADC 44 receives a white threshold adjust signal and a black threshold adjust signal from adjustment circuits 46 and 48, respectively, and utilizes these inputs to quantize the analog video signal in accordance with a desired number of gray levels. Accordingly, the four-bit parallel output of ADC 44 has the capability of defining a maximum of 16 different gray levels of the analog video input. In the ADC 44 the start of each new conversion cycle is dictated by a clock input (designated PIXEL CLOCK), received from the clock generator 56. Moreover, the ADC 44 receives a negative/positive control input from the bus 82, as a result of which the ADC 44 either produces a video digital signal corresponding to a positive image, or by means of a one's-complement procedure produces a digital signal representing a negative image.

Digital packing registers 50 are typical eight-bit buffer registers (such as the LS 377). Registers 50 receive and pack each successive pair of four-bit parallel signals from the ADC 44, and provide a corresponding eight-bit digital video output to multiplexer 52. More specifically, a first conversion performed by the ADC 44 results in conversion of one pixel of the video signal input into a digital video output (four bits); a second conversion results in the provision of a second digital video output corresponding to a second pixel, and this four-bit output is also provided to the register 50. Registers 50 then provide two pixels worth of video digital output to the multiplexer 52. The packing function which results in an eight-bit output is necessary in order to achieve efficiency of operation of the overall system, inasmuch as the microprocessor 80 is an eight-bit machine.

Multiplexer 52 performs a multiplexing operation with respect to data input to the high speed line memory or random access memory (RAM) 54. Specifically, multiplexer 52 responds to a control input INPUT (A/B) SELECT received, via bus 82, from microprocessor 80 to selectively provide a data path from either the digital packing registers 50 or the bus 82 to the memory. In the first case, data corresponding to newly digitized video information is being provided to the memory 54 in real time; in the second case (for example, in the multi-formatting mode), previously stored digital information (as stored in picture memory 88 (FIG. 2b)) is provided via the bus 82 and multiplexer 52 to the memory 54. This has been discussed above in connection with use of controls 17, 18 and 29 (FIG. 1b) to achieve a multiformatting capability in the 4× or 12× modes.

Line memory 54 is controlled in its input and output operations by a control input READ/WRITE, provided via multiplexer 68 from either line store control logic 60 or the bus 82. Line memory 54, operating at high speed, clocks out the digital video stored therein, providing the same to the bus 82, for subsequent provision to either the printer 84 (FIG. 2b) or the picture memory 88. Whether or not the data is provided to the printer 84 or the memory 88 is determined by whether or not the system is in the print mode or the store mode.

The timing for the operation of the system of FIG. 2a is provided by the clock generator 56, synchronization signal detector circuit 58, line store control logic 60, video line counter 62 and pixel/byte counter 64, operating to provide control signals via multiplexer (for memory address) 66 and multiplexer (for memory control) 68. Operation is as follows.

Synchronization signal detector circuit 58 receives the analog video output of DC restoration circuit 42 and, in a manner to be described in more detail below and with reference to FIGS. 2c and 2d, derives various control outputs from the sync signal conventionally associated with the video signal. More specifically, detector circuit 58 detects the presence of the sync signal, and determines when the scanner in the video camera (not shown) is in the "horizontal blanking" mode (for example, at the end of the scanning of a line) or the "vertical blanking" mode (for example, at the end of the scanning of a frame), or is at the beginning of a new line (as indicated by a horizontal sync pulse) or at the beginning of a new field (as indicated by a vertical sync pulse). Detector circuit 58 produces various control outputs, and provides these outputs to various other elements. Specifically, output HORIZONTAL BLANKING is provided to line store control logic 60; output NEW LINE PULSE is provided to the COUNT input of video line counter 62; output NEW FIELD PULSE is provided to the RESET input of video line counter 62; and output VERTICAL BLANKING is provided via the bus 82 to the microprocessor 80 as a status signal.

Video line counter 62 counts the number of lines (corresponding to input NEW LINE PULSE) between consecutive vertical sync signals (NEW FIELD PULSE), and provides an indication of the video line number to the bus 82. In this manner, the processor 80 is able to supervise the system, and to be aware of the actual video line number being scanned at each instant. Similarly, detector circuit 58 provides an output FIELD NUMBER, corresponding to the number of the field being scanned, thus keeping the processor 80 apprised of this information as well. As will be seen in more detail below, with this information available, the micro-processor 80 is able to compensate for the fact that the video camera (not shown) scans at a much higher rate relative to the speed of operation of the system. That is to say, since the various operations performed by the system (for example, the analog-to-digital conversion operation) are performed at a slower speed than the scanning of the video camera, it is necessary for the system (via the video line counter 62 and the micro-processor 80) to keep track of the video line number of the line just scanned (relative to which the data is being digitized and stored), so that, despite the number of scans performed in the intervening time, the next analog video information sampled and digitized by ADC 44 will correspond to the next succeeding video line.

The line store control logic 60 will also be described in more detail below, with reference to FIGS. 2e and 2f. Control logic 60 receives the signal PIXEL CLOCK from the generator 56, thus being advised of each start of a conversion process. Moreover, control logic 60 receives a horizontal blanking input from the detector circuit 58; as well as a video line request signal via bus 82 from the micro-processor 80. In a manner to be described in more detail below, control logic 60 processes these inputs so as to develop various outputs: Output ENABLE provided to enable the operation of the pixel-byte counter 64; a CLEAR output for the purpose of clearing the counter 64; an output CLOCK ENABLE for the purpose of enabling the clock generator 56; an output PACK for controlling the packing of digital data in registers 50; and an output R/W provided to the multiplexer 68, so that the control logic 60, in a certain system mode of operation, controls the operation (read or write) of the line memory 54.

Referring to FIG. 2b, the system control panel 14 receives various control inputs and provides various status outputs, and has been described in detail above with reference to FIGS. 1a and 1b. It is to be noted that system control panel 14 comprises any conventional control panel for providing control panel signals and displaying status signals, the manner of forming these control status functions being obvious to those of skill in the art.

The gray scale printer 84 receives various control data, pixel data, and (if desired) ASCII character data from the bus 82, and provides various status signals to the bus 82. The printer 84 is, in the preferred embodiment, a Bell & Howell CEC-912 printer, or similar device. The printer 84 produces a high quality gray scale image, as well as line graphics and alphanumeric printouts by means of an electro-sensitive recording process. Printouts so produced require no subsequent process in terms of heating or toner application, and still yield a clear, dry, legible printout. The printer 84 produces 16 shades of gray (from white to solid black), with each step being aligned accurately by means of a four-byte digital command. Resolution of the printer 84 is preferably 200 pixels per inch, regardless of gray scale steps. Maximum printing width of the printer 84 is, in the preferred embodiment, 10.1 inches, the image being printed on an 11 inch wide paper roll, with roll length preferably of 350 feet. Unrecorded paper and completed prints are completed unaffected by normal environmental changes such as light, temperature and humidity. Preferably, the operation of printer 84 is such that 2,048 pixels (separated by 0.005 inches spacing) are addressed during each full width printed line. The recording paper is incremented, in the preferred embodiment, at a distance of 0.005 inches between printed lines, resulting in 200 lines per inch resolution in the longitudinal direction as well.

Gray scale shades are produced by digitally controlling the size of each pixel, not by varying the number of pixels in a specific area, as in other conventional systems. More specifically, the printer 84 is a pulse duration printer, calling for the printing of dots (each corresonding to a pixel) having a size which is a function of the duration of a pulse derived in the printer as a result of the received digital coded output, in this case, the digital pixel data received from either the high speed line access memory 54 or the picture memory 88.

Further referring to FIG. 2b, the program memory 86 may be any conventional read-only memory or read-write memory suitable for storing micro-instructions for implementation by the micro-processor 80 which receives such instructions via the bus 82. Control and address signals are provided via the bus 82 to the program memory 86, as is conventionally known in the art, and data (in the form of instructions) are provided to the micro-processor 80 via the bus 82.

The picture memory 88 receives control, address, bank select and data out signals from the bus 82 and provides data input signals to the bus 82. More specifically, in response to control, address and bank select inputs, data may be written to or read from the picture memory 88. The bank select signals are utilized in a multi-formatting mode of operation, wherein (as previously described) two or more pictures may be read into the system and stored, and then virtually simultaneously read out so that they may be printed in a desired array on a single sheet of printout paper. Any conventional random access memory (RAM) can be utilized to implement the picture memory 88 FIG. 2b.

Figure 2C:
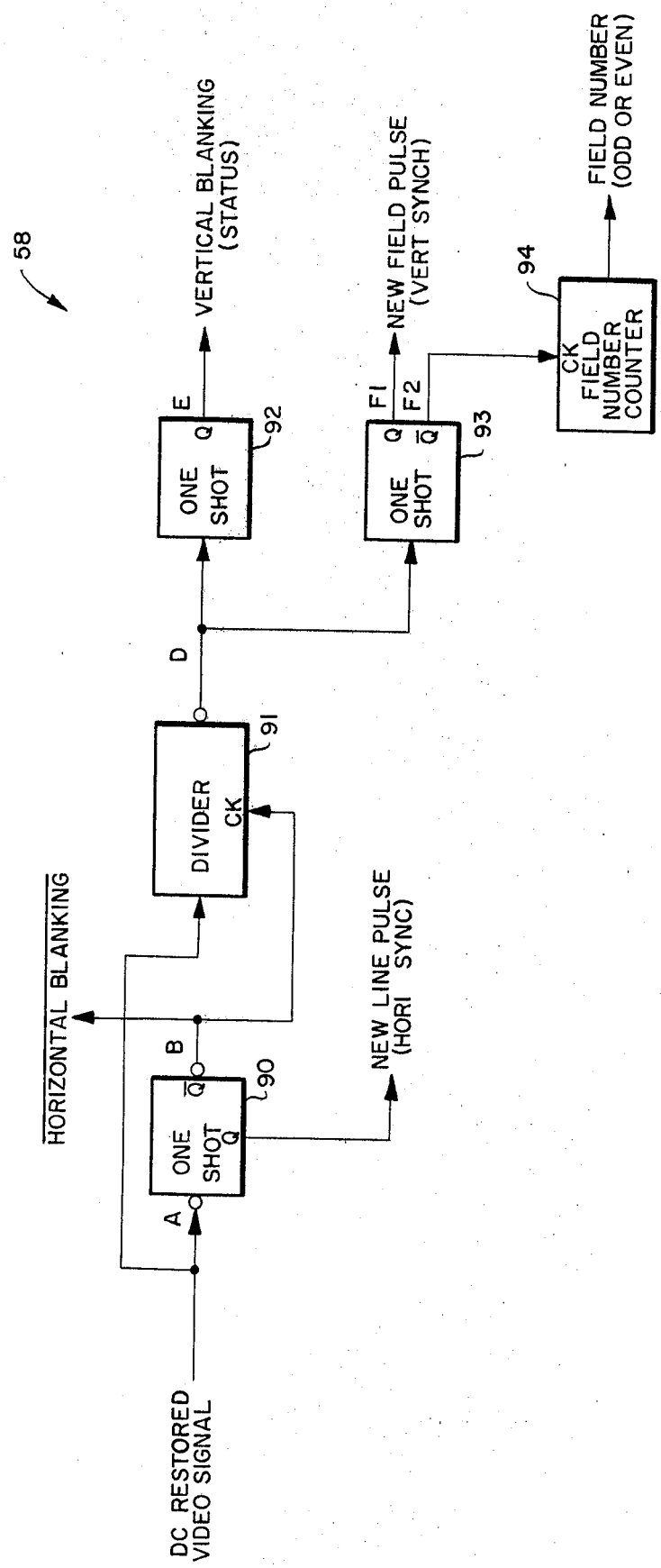
Figure 2D:
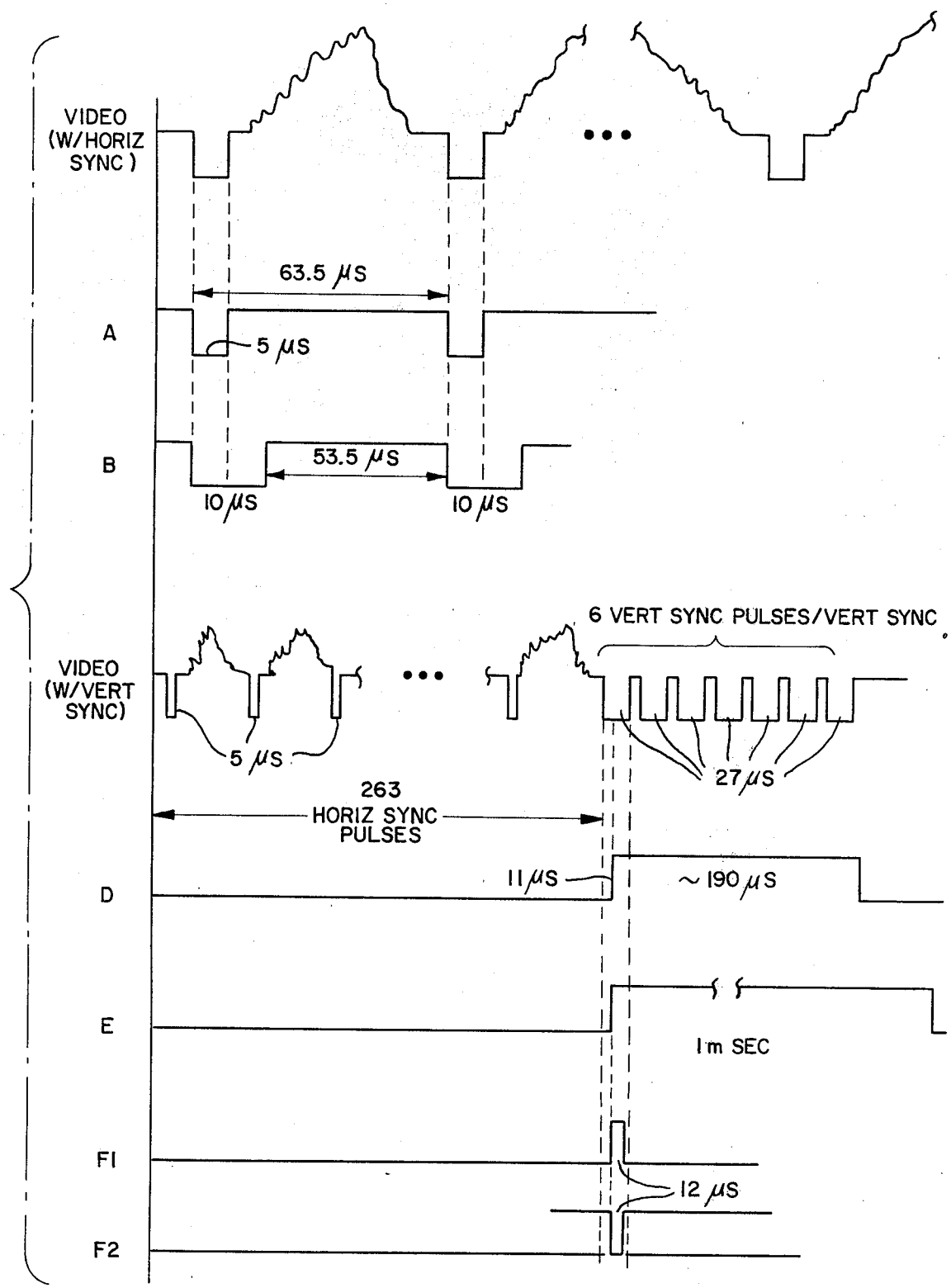

FIG. 2c is a detailed circuit diagram of the synchronization signal detector of FIG. 2a, while FIG. 2d is a timing diagram related to the operation of the synchronization signal detector circuit.

As seen in FIG. 2c, the synchronization signal detector 58 comprises one-shot devices 90, 92 and 93, divider circuit 91 and counter 94. In operation, and with reference to the timing diagram of FIG. 2d, one-shot device 90 receives the DC-restored video signal at its inverting input. This received video signal is designated VIDEO (W/HORIZ. SYNC.) in FIG. 2d, and contains numerous horizontal synchronization pulses. As shown in wave form A of FIG. 2d, these horizontal synchronization pulses are approximately five microseconds in length and occur every 63.5 microseconds. As a result of one-shot device 90, wave form B of FIG. 2d is produced, and this wave form constitutes output $\overline{\text{HORIZONTAL BLANKING}}$, with its inverse being NEW LINE PULSE (HORI. SYNC.). Moreover, the output of one-shot device 90 is applied to the clock input of divider circuit 91, the latter receiving the DC-restored video signal at its primary input. Divider 91 is a dual D-type flip-flop (LS74) with its preset and clear inputs permanently enabled.

Further referring to FIG. 2d, it is to be noted that the DC-restored video signal also includes a vertical synchronization pulse train consisting of six vertical sync pulses occurring after every 263 horizontal sync pulses. Each of the six vertical sync pulses is 27 microseconds in duration, and is applied to the main input of the divider 91. The latter (arranged as described above), when clocked by the six vertical sync pulses, produces a wide pulse of approximately 190 microseconds duration (wave form D).

The output D of circuit 91 is applied as an input to one-shot devices 92 and 93. As a result of its operation, one-shot device 92 produces output E (FIG. 2d), which constitutes the output VERTICAL BLANKING (STATUS) of the synchronization signal detector 58. Moreover, as a result of its operation, one-shot device 93 produces outputs F1 and F2 (one being the inverse of the other). Output F1 comprises NEW FIELD PULSE (VERT. SYNCH.); output F2 clocks counter 94 to develop FIELD NUMBER (designating ODD or EVEN field).

Thus, the synchronization signal detector 58 produces outputs which designate when the video signal is in the horizontal blanking mode, is in the vertical blanking mode, is at the beginning of a new line, or is at the beginning of a new field. Additionally, the circuit 58 indicates whether or not the video signal is in an odd or even field.

FIG. 2e is a wave form diagram relating to the operation of the control logic 60 of FIG. 2a.

As previously explained, control logic 60 receives an input VIDEO LINE REQUEST from the microprocessor 80 via the bus 82. At some point during the 63.5 microseconds duration of the VIDEO LINE REQUEST, the square pulse HORIZONTAL BLANKING generated by the synchronization signal detector 58 occurs. Control logic 60 detects coincidence of VIDEO LINE REQUEST being high and the trailing edge (high-to-low transition) of HORIZONTAL BLANKING, and in response thereto issues signal CLOCK ENABLE which is provided to the clock generator 56. As a result, clock generator 56 generates its output CLOCK as seen in FIG. 2e.

After three time periods (T1, T2, T3) of the CLOCK signal, control logic 60 generates the CLEAR signal applied to counter 64, thus resetting the counter 64 to zero. One additional time period later (T4), control logic 60 generates an ENABLE signal, also applied to the counter 64 so as to cause it to start counting pixels/bytes.

At the same time that the counter 64 is enabled, control logic 60 generates output PACK, which is applied to the packing registers 50. Output PACK is a square wave pulse train which has a period of 2T, in accordance with which 4-bit digital data from the ADC 44 is stored in the packing registers 50.

In addition, ½ T period later (that is ½ T after beginning of the output PACK), the control logic 60 generates a further series of square pulses constituting output R/W to the memory control multiplexer 68. These square pulses are designated $\overline{WRITE}$ and $\overline{ENABLE}$ in FIG. 2e and are provided through the memory control multiplexer 68 as signals READ/WRITE applied to the high speed line memory 64. As a result of this operation, the high speed line memory 54 receives successive 8-bit inputs (DATA IN) from the data input multiplexer 52, thus storing successive pixel data provided by the packing registers 50.

At the same time, counter 64 is providing successively increasing count values, via the memory address multiplexer 66, to the high speed line memory 54 as output ADDR, thus causing memory 54 to store successively received pixel data at successive locations in the memory 54.

The above constitutes a description of the manner in which the control logic 60 responds to its various inputs (set forth as wave forms in FIG. 2e) to produce its control outputs (also shown in FIG. 2e). Numerous design arrangements of control logic 60 may be developed by those familiar with digital processing technology in order to implement the operations set forth graphically in FIG. 2e. For example, control logic 60 may be implemented by the following devices: an octal D-type flip-flop with clear (LS273), a dual D-type, flip-flop with preset and clear (LS74), a quadruple 2-input positive AND GATE (LS08), and an octal buffer line driver tristate (LS240). Nevertheless, as previously mentioned, other readily available off-the-shelf integrated circuits may be utilized by a skilled technician to implement the operations/functions of control logic 60, as described above with reference to FIG. 2e.

The operation of the system of the present invention, and more particularly the functions performed by the micro-processor 80 of FIG. 2a will now be described in more detail, with reference to flow charts shown in FIGS. 3a through 3d.

Figure 3A:
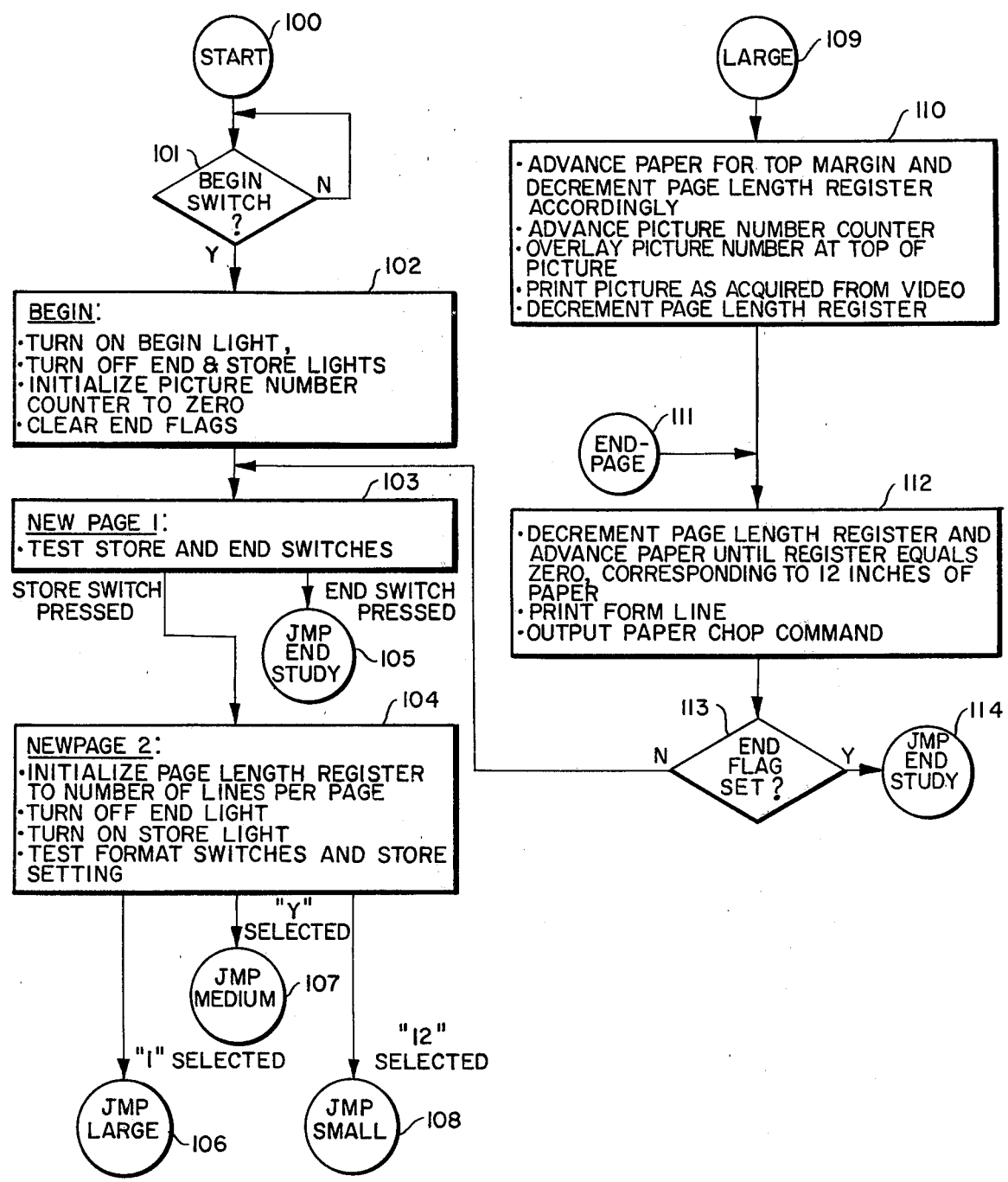
Figure 3B:
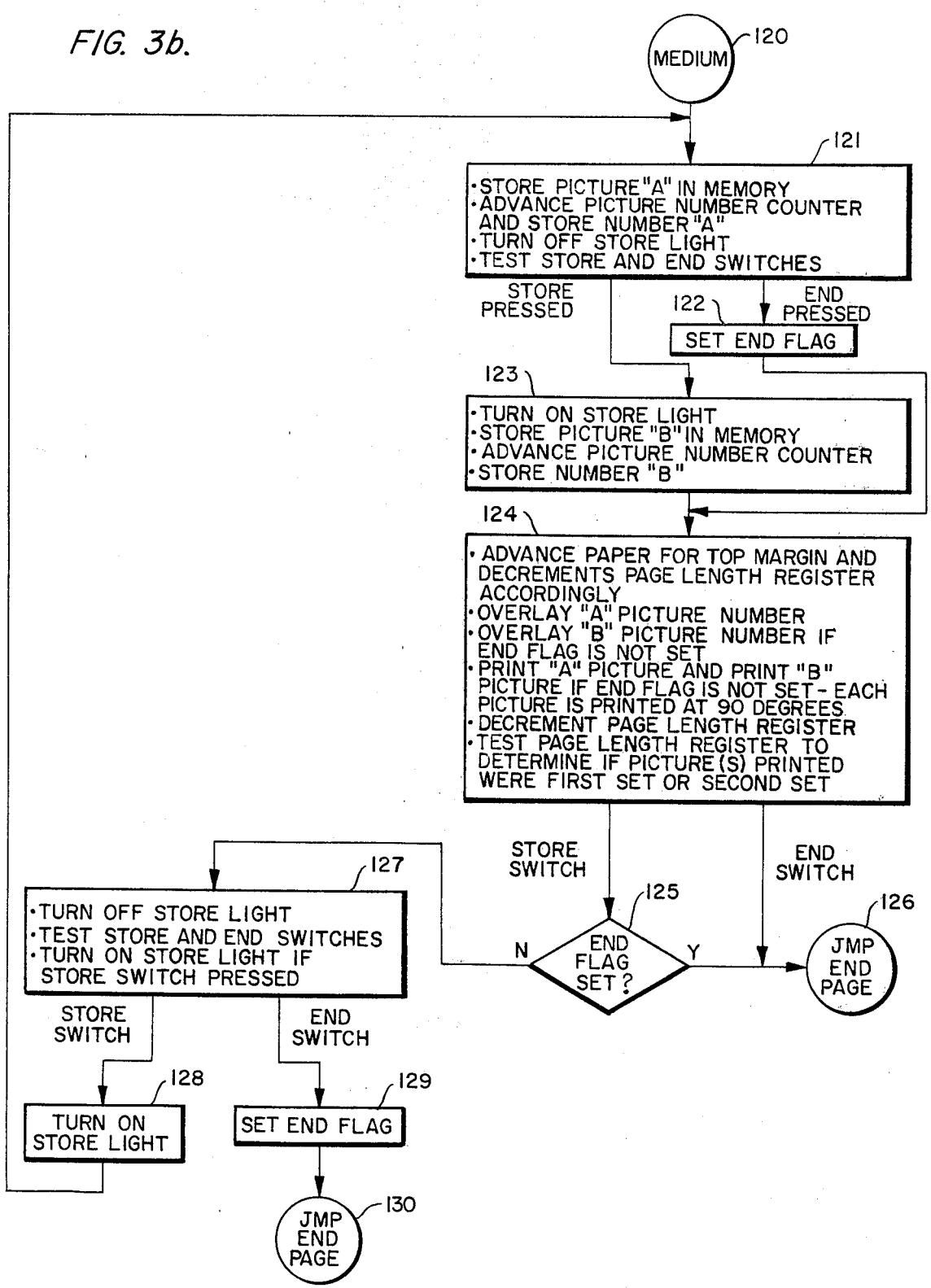
Figure 3C:
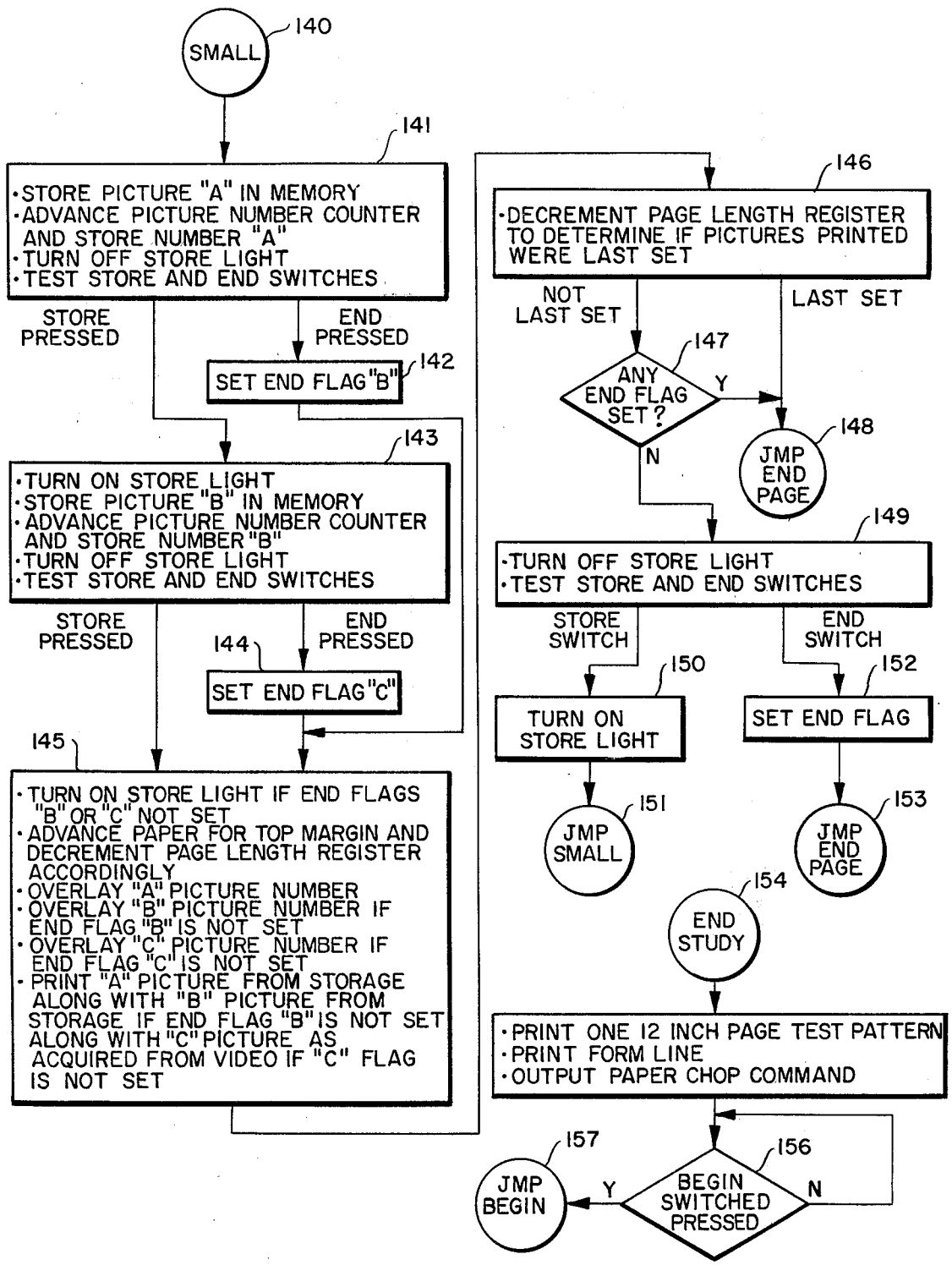

FIGS. 3a through 3c are flow charts of the operations performed by the micro-processor 80 in conjunction with the accomplishment of the multi-formatting mode of operation of the system. In such mode of operation, the procedure is as follows.

Operations in this mode are commenced (block 100) by checking the status of the BEGIN switch 28 (FIG. 1b), as indicated in block 101 (FIG. 3a). If the switch has been actuated, various initializing operations are performed (block 102). Then, the STORE switch 29 and the END switch 30 are checked (block 103).

If the END switch has been pressed, a jump is executed (block 105) to END STUDY (block 154) (FIG. 3c). If the STORE switch has been pressed, various other initialization operations are performed (block 104).

Then, a check of the format switches 16, 17 and 18 is made. If the 1X format has been chosen, the microprocessor 80 branches to the sequence of operations corresponding to the 1×mode of operation (blocks 106 and 109). If the 4×mode of operation has been chosen, a branch to those sequence of steps corresponding thereto is executed (blocks 107 and 120), while if the 12X mode has been selected, a branch to the series of steps corresponding thereto is executed (blocks 108 and 140).

Presuming that the 1×mode of operation has been chosen (that is, printing of a single image on a single page), the operations indicated in blocks 109 through 114 of FIG. 3a are executed. Specifically, paper is advanced, various registers are adjusted, a picture number counter is advanced, the picture number is overlaid at the top of the picture, and the picture as acquired from the video signal is printed.

In this particular mode of operation, printing of the picture is accomplished by printing each video line three times in vertical succession, there being 480 pixels per video line stored. Moreover, each pixel in a line is printed twice horizontally. As a result, the appropriate size of image and desired aspect ratio are obtained.

The procedure continues by decrementing a page length register and advancing the paper until the register equals zero corresponding to 12 inches of paper. Then a form line is printed, and the paper is caused to be severed by means of a "chop" command issued by the micro-processor 80 (block 112).

A check of an end flag is then made (block 113), and if the flag is not set a return to block 103 is executed; if the flag is set, a branch to "end study" (block 154) (FIG. 3c) is executed.

In the event that the 4× mode of operation is selected in block 104 (FIG. 3a), a branch to a sequence of operations corresponding to that mode of operation is executed (blocks 107 and 120). Then, the first picture (of four to be printed in 4× format), designated picture A, is stored in memory (in accordance with 480 video lines, 640 pixels per line). The picture number counter is advanced and the designation of picture A is stored, the "store" indicator (associated with STORE switch 29 of FIG. 1b) is turned off, and the STORE and END switches are tested.

If the STORE switch is pressed, block 123 is executed, such that the "store" light is turned on, picture B is stored in memory, the picture number counter is advanced, and the identification of picture B is stored. If the END switch is pressed, an "end" flag is set (block 122), and block 124 is executed. Specifically, a paper advance and decrementing of the page length register takes place, the picture number of picture A is overlaid, and the picture number of picture B is overlaid if the "end" flag is not set. Then, picture A is printed, and picture B is printed if the "end" flag is not set. In this particular mode of operation, as previously explained, pictures A and B are both printed with 90 degree rotation, that is, each horizontal video line is printed in the vertical direction. This is to ensure that both pictures will fit side by side on the printout sheet. Further considering block 124, the page length register is decremented and tested to determine if the pictures printed were the first set or the second set of the two pairs of pictures in the 4× format. If the first set was printed, a check of the "end" flag is made (block 125), and if the flag is not set, block 127 is executed, while if the flag is set, a branch to "end page" is executed (blocks 126 and 111).

Referring to block 127, various indicators are turned off and on, and the STORE and END switches 29 and 30, respectively, are tested. If the STORE switch 29 is pressed, the "store" light is turned on, and a return branch to block 21 is executed; if the END switch is on, the "end" flag is set (block 129), and a branch to "end page" is executed (blocks 130 and 111).

Referring to FIG. 3c, if the 12× format is chosen, the micro-processor 80 branches to a corresponding sequence of instructions (blocks 108 and 140). In accordance with the sequence of instructions, picture A is stored in memory (in accordance with 480 video lines, 640 pixels per line), the picture number counter is advanced and the identifying number of picture A is stored. The "store" light is turned off, and the STORE switch 29 and END switch 30 are checked.

If the STORE switch 29 is pressed, block 143 is executed, such that the "store" light is turned on, the picture B is stored in memory, the picture number counter is advanced, the number identifying picture B is stored, the "store" light is turned off, and the STORE and END switches 29 and 30, respectively, are tested. If the STORE switch 29 is pressed, the various operations contained in block 145 are executed, followed by execution of the operations described in block 146. With reference to block 146, a determination is made as to whether or not the pictures printed comprise the last set of pictures in the 3×4 array of pictures. If the pictures printed are not the last set, the "end" flag is checked (block 147). If the flag is set, a branch to "end page" is executed (blocks 148 and 111); if the flag is not set, the operations set forth in block 149 are executed, including a testing of the STORE and END switches 29 and 30 (block 149).

Considering block 149, if the STORE switch 29 is pressed, the "store" light is turned on (block 510), and a branch to the beginning of the sequence of operations for the 12× mode of operation is executed (blocks 151 and 140).

On the other hand, if the END switch 30 is pressed, the "end" flag is set (block 152), and a branch to "end page" is executed (blocks 153 and 111).

Returning to block 146, if the pictures printed are the last set, a branch to "end page" is executed (blocks 148 and 111).

Returning to block 143, if the END switch 30 is pressed, the "end flag" (C) is pressed (block 144), and then the sequence of operations beginning with block 145 is executed.

Finally, returning to block 141, if the END switch 30 is pressed, the "end" flag (B) is set (block 142), and a branch to block 145 (and the succeeding operations) is executed.

Figure 3D:
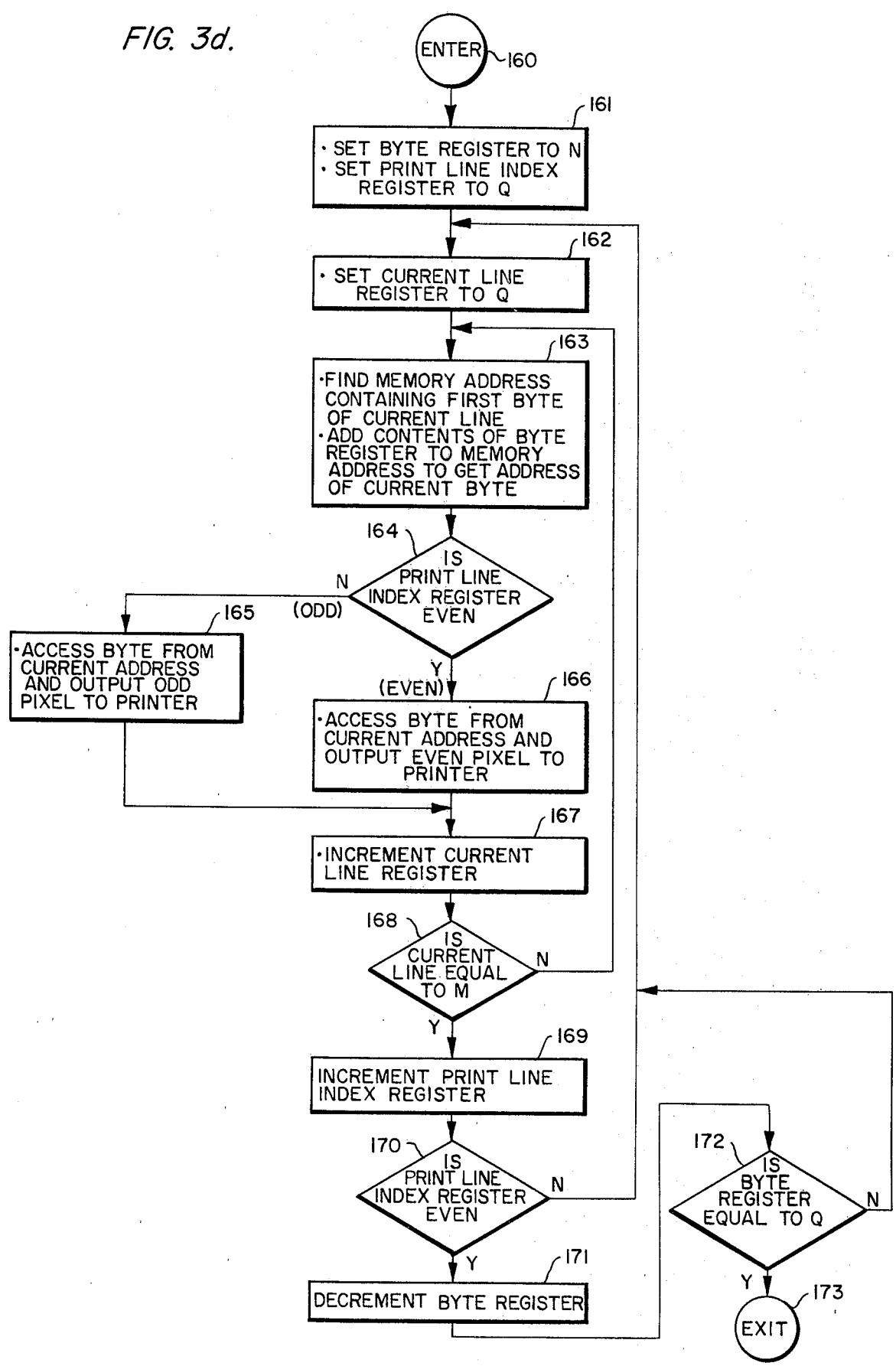

The operations performed by the micro-processor 80 will now be further described with reference to FIG. 3d, which is a flow chart of those operations of the micro-processor 80 which are performed in order to print a previously stored picture rotated by 90 degrees. It will be recalled that, in the 4× mode of operation, in order to print two images side by side on a printout sheet, it is necessary to rotate the image by 90 degrees prior to printing it out.

The "90 degree rotation" sequence of operations is entered (block 160) upon determination that the 4× format has been selected by the operator (see block 124 of FIG. 3b discussed above). The micro-processor 80 sets a byte register to a number N, which is the number of bytes stored per video line, and sets a print line index register to Q (block 161). A current line register is then set to Q (block 162). Micro-processor 80 then finds the memory address containing the first byte of the current line, and adds the contents of the byte register to the memory address to get the address of the current byte (block 163).

A decision is then made as to whether or not the print line index register is even (block 164). If it is even, a byte from the current address is accessed and an even pixel is provided as an output to the printer (block 166). Micro-processor 80 then proceeds to execution of block 167.

If the print line index register is not even (that is, if it is odd), then a byte from the current address is accessed, and the odd pixel is provided as an output to the printer (block 165).

Operations then proceed in accordance with execution of block 167, increment of the current line register. Then, a decision is made as to whether or not the current line equals M (the number of video lines stored). If the current line does not equal M, a return branch is executed (blocks 168 and 163). If the current line does equal M, the print line index register is incremented (block 169). Then, a further decision as to whether or not the print line index register is even is executed (block 170). If it is not even, a return branch to block 162 is executed; if it is even, the byte register is decremented (block 171), and a further determination as to whether or not the byte register is equal to Q is made (block 172). If the byte register is not equal to Q, a return branch to block 162 is executed; if it is equal to Q, the routine is terminated (block 173).

While preferred forms and arrangements have been shown in illustrating the invention, it is to be clearly understood that various changes in detail and arrangement may be made without departing from the spirit and scope of this disclosure.

What is claimed is:

1. A method of reproducing a plurality of images on a printer in printed form in accordance with selectable, variable multiple formats, said method comprising the steps of:
   (a) selecting a given one of said selectable, variable multiple formats;
   (b) receiving digital data corresponding to each of said plurality of images to be reproduced except for one of said plurality of images;
   (c) storing said digital data corresponding to each of said plurality of images except for one of said plurality of images;
   (d) receiving digital data corresponding to said one of said plurality of images;
   (e) multiplexing said digital data corresponding to said each of said plurality of images except for one of said plurality of images, with said digital data corresponding to said one of said plurality of images, in accordance with said selected given one of said selectable, variable, multiple formats to derive multiplexed digital data;
   (f) providing said multiplexed digital data to said printer; and
   (g) printing said plurality of images in correspondence to said multiplexed digital data provided to said printer, whereby to reproduce said plurality of images in printed form in accordance with said selected given one of said selectable variable, multiple formats.

2. The method of claim 1, comprising the additional steps, between steps (a) and (b), of:
   providing a video camera,
   scanning said plurality of images with said video camera to develop a video signal, and
   digitizing said video signal to derive said digital data corresponding to each of said plurality of images to be reproduced.

3. The method of claim 1, comprising the additional step, after step (b), of processing said digital data corresponding to each of said plurality of images to be reproduced except for one of said plurality of images so as to develop first additional digital data corresponding to a rotated version of each of said plurality of images to be reproduced except for one of said plurality of images, said method further comprising the step, after step (d) of processing said digital data corresponding to said one of said plurality of images so as to develop second additional digital data corresponding to a rotated version of said one of said plurality of images.

4. A system for reproducing a plurality of images on a printer in printed form in accordance with selectable, variable multiple formats, comprising:
   selecting means for selecting a given one of said selectable, variable multiple formats;
   receiving means for receiving digital data corresponding to each of said plurality of images to be reproduced;
   storage means for storing said digital data corresponding to each of said plurality of images to be reproduced except for one of said plurality of images;
   output means for reading out, from said storage means, said digital data corresponding to each of said plurality of images to be reproduced except for one of the plurality of images;
   multiplexing means for multiplexing said digital data corresponding to said each of said plurality of images except for one of said plurality of images with said digital data corresponding to said one of said plurality of images, so as to provide a multiplexed digital output; and
   printing means responsive to said multiplexed digital data output of said multiplexer means for printing said plurality of images in correspondence thereto, whereby to reproduce said plurality of images in printed form in accordance with said selected given one of said selectable, variable multiple formats.

5. The system of claim 4, further comprising processor means for processing said digital data read out from said storage means so as to derive further digital data corresponding to a rotated version of each of said plurality of images, and for providing said further digital data to said multiplexer means.

6. The system of claim 4, further comprising camera means for scanning said plurality of images to be reproduced so as to develop a video signal output, and digitizing means for digitizing said video signal output of said camera means so as to derive said digital data corresponding to each of said plurality of images to be reproduced.

7. The system of claim 6, wherein said camera means comprises a TV camera which scans said plurality of images in accordance with horizontal scan lines identified by horizontal sync pulses in said video signal output, said system comprising synchronization means responsive to said horizontal sync pulses for issuing a new line pulse, said receiving means being responsive to said new line pulse for receiving said digital data corresponding to said horizontal scan line identified by said horizontal sync pulse.

8. The system of claim 7, wherein a predetermined number of said horizontal scan lines comprise a field, each said field being identified by a vertical sync pulse in said video signal output, said synchronization means being responsive to each said vertical sync pulse for issuing a corresponding new field pulse, said system further comprising video line counter means responsive to said new line pulse for counting said horizontal scan lines scanned by said TV camera to develop a corresponding count value, said video line counter means being responsive to said new field pulse for resetting said corresponding count value to zero.

9. The system of claim 6, further comprising clock generator means for generating a clock output, said digitizing means being responsive to said clock output for sampling said video signal output to derive picture element data for digitization.

10. The system of claim 9, further comprising control means responsive to said clock output for generating a packing signal, said receiving means comprising packing register means responsive to said packing signal for receiving and storing said digital data derived by said digitizing means.

11. The system of claim 4, wherein said storage means comprises a high speed line memory for receiving said digital data corresponding to each of said plurality of images to be reproduced except for one said plurality of images, and a picture memory for storing said digital data corresponding to each of said plurality of images to be reproduced except for one of said plurality of images, said multiplexing means receiving said digital data corresponding to said one of said plurality of images from said receiving means and receiving said digital data corresponding to said each of said plurality of images except for one of said plurality of images from said picture memory.

12. The system of claim 11, wherein said multiplexing means provides said multiplexed digital output to said high speed line memory, said printing means receiving said multiplexed digital data output from said high speed line memory for printing said plurality of images in correspondence thereto.

13. The system of claim 4, wherein said printing means comprises a gray line printer.

* * * * *